United States Patent [19]
Fagelman

[11] 3,896,553
[45] July 29, 1975

[54] DENTAL INSTRUMENT AND CLAMP

[76] Inventor: Jacob Fagelman, 1022 E. 23rd St., Brooklyn, N.Y. 11210

[22] Filed: Oct. 3, 1973

[21] Appl. No.: 395,212

[52] U.S. Cl. ............................................. 32/63
[51] Int. Cl.² ................................... A61C 5/12
[58] Field of Search ................... 32/63; 401/221

[56] References Cited
UNITED STATES PATENTS
1,902,850  3/1933  Greene ........................... 32/63
2,464,763  3/1949  McClure ....................... 120/110

Primary Examiner—Louis G. Mancene
Assistant Examiner—J. Q. Lever
Attorney, Agent, or Firm—Leo C. Krazinski

[57] ABSTRACT

A dental instrument of non-corrosive, flexible metal having a shape conforming to cervical contours of teeth for carrying material to a prepared tooth cavity and then filling the cervical cavity of the tooth, and means for holding the instrument in place until the filling has set.

5 Claims, 10 Drawing Figures

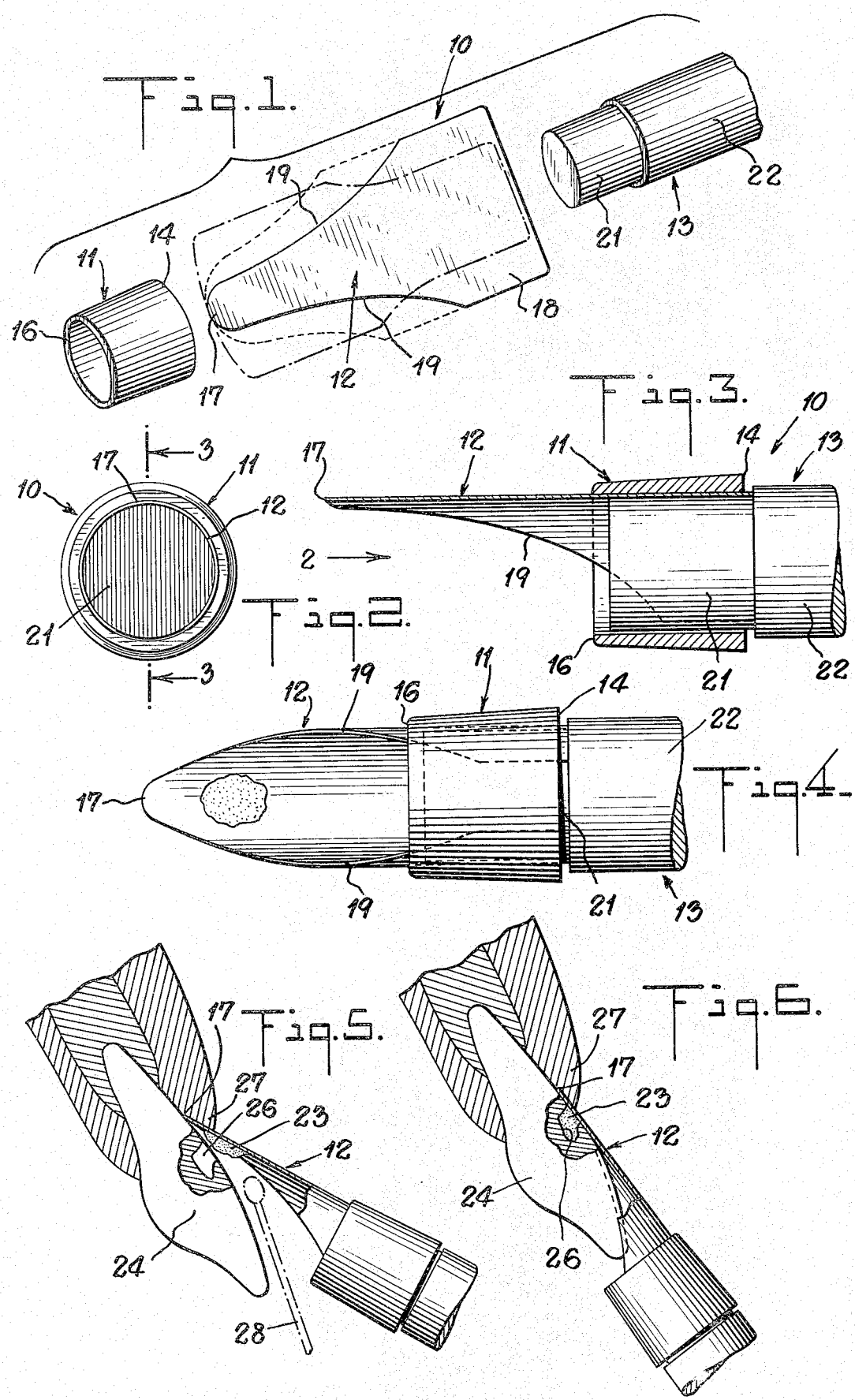

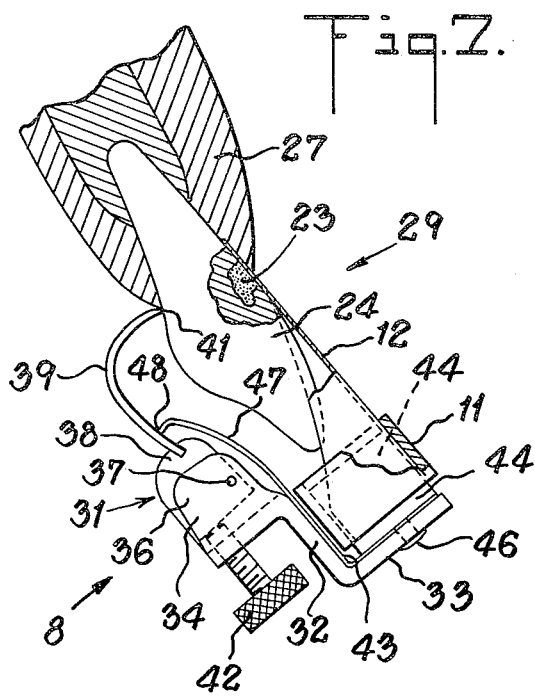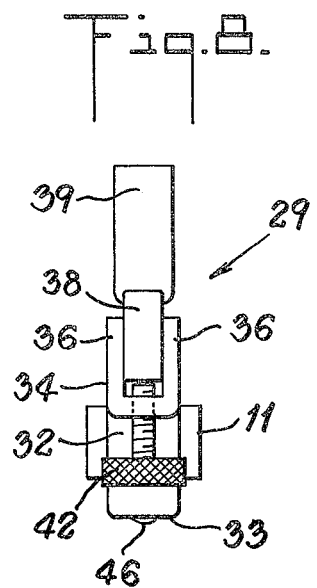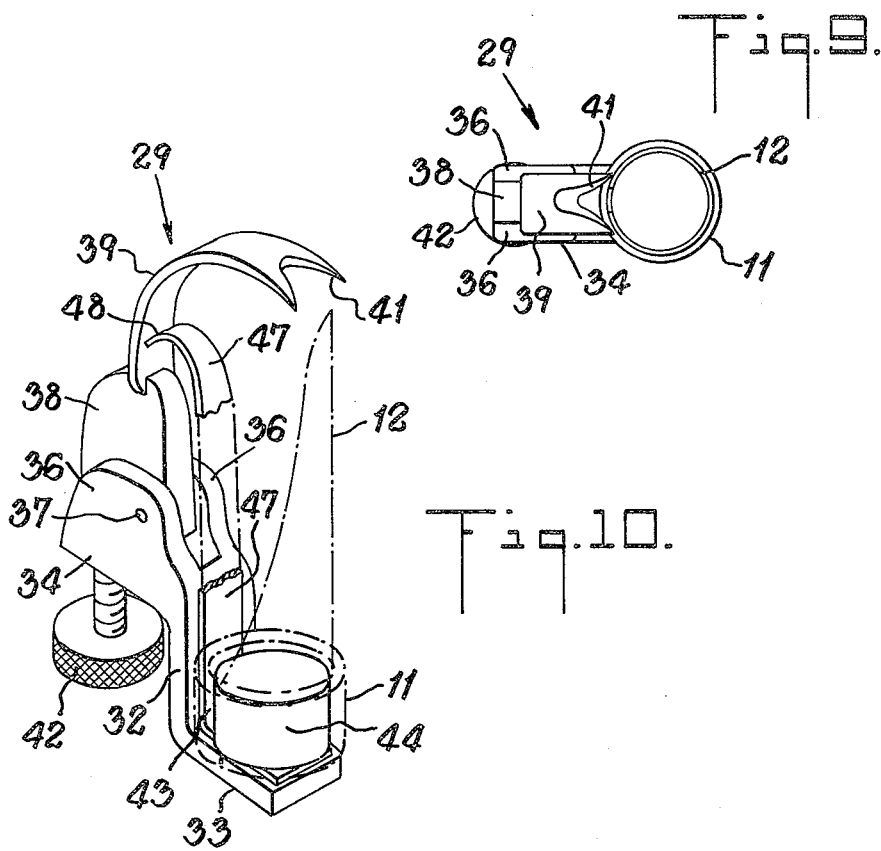

DENTAL INSTRUMENT AND CLAMP

BACKGROUND OF THE INVENTION

1. Field of the Invention

The present invention relates to a dental instrument for filling teeth, including a clamp for removably securing the instrument to a tooth and, more particularly, to an improved dental instrument and clamp for the filling of cervical cavities in teeth.

In the past, flexible dental instruments of plastic material have been used in filling cervical cavities in teeth, as evidenced by Greene Patent bearing U.S. Pat. No. 1,902,850 of Mar. 28, 1933. However, plastic material cannot now be used for such dental instruments, as the newer type filling material corrodes the plastic instrument. Also, dental clamps have heretofore been used in holding a dental instrument to a tooth, as is evidenced by Taylor U.S. Pat. No. 2,583,903 of Jan. 29, 1952.

2. Summary of the Invention

Accordingly, an object of the present invention is to provide an improved dental instrument of flexible, non-corrosive metal which is impervious to the new type filling material.

Another object is to provide an improved dental instrument for carrying the filling material to the cervical area of the tooth, for pressing said filling material into the cervical cavity, for conforming the external surface of the filling material with that of the tooth surface, and an improved dental clamp for holding the instrument to the tooth for the required time.

A further object is to provide such an improved dental instrument that, when used with the newer filling materials, will produce a glassy and strong outer surface of the filling material in conformity with the surface of the tooth.

Yet another object is to provide such an improved dental instrument having a matrix of sufficient strength, yet flexible, to remain in proper contour upon application of substantial pressure.

Still another object is to provide such a dental instrument and clamp that is simple, practical and economical in construction, and is reliable and efficient in operation.

Other and further objects will be obvious upon an understanding of the illustrative embodiment about to be described, or will be indicated in the appended claims and various advantages not referred to herein will occur to one skilled in the art upon employment of the invention in practice.

BRIEF DESCRIPTION OF THE DRAWINGS

A preferred embodiment of the invention has been chosen for purposes of illustration and description and is shown in the accompanying drawings, forming a part of the specification, wherein:

FIG. 1 is an exploded perspective view of component parts of the improved dental instrument embodying the present invention.

FIG. 2 is an end view of the assembled dental instrument looking into the left end of FIG. 3, as indicated by the arrow 2.

FIG. 3 is a sectional view taken along lines 3—3 of FIG. 2 in the direction of the arrows.

FIG. 4 is a bottom plan view of FIG. 3 showing filling material disposed on the dental instrument.

FIG. 5 is a side view of the instrument, partially in section, during initial operation thereof in carrying filling material to the prepared tooth cavity.

FIG. 6 is a side view similar to FIG. 5 in which the filling material has been forced into the tooth cavity by the instrument and the exterior surface of the filling material is ready to be wiped smooth in conformity with the tooth surface by the instrument.

FIG. 7 is a side elevational view, partly broken away, of the dental instrument shown in FIG. 6 attached to an improved clamp for securing the instrument to the tooth.

FIG. 8 is an end elevational view of the combined dental instrument and clamp shown in the direction of the arrow in FIG. 7.

FIG. 9 is a top plan view of the combined dental instrument and clamp.

FIG. 10 is a side elevational view, partly broken away, particularly of the improved dental clamp.

DESCRIPTION OF PREFERRED EMBODIMENTS

With the advent of new filling material for teeth, such as produced by Johnson & Johnson under its trademark ADAPTIC and patented under U.S. Pat. No. 3,539,533, conventional plastic cervical matrix devices are unsatisfactory for use therewith, as the plastic instrument is chemically attacked by this new filling material. Consequently a metallic non-corrosive material must be used in construction of a dental instrument when the new filling material is to be used by dentists.

Referring now to one embodiment of the invention, particularly to FIGS. 1, 2 and 3 of the drawings in detail, there is shown a dental instrument 10, termed a cervical matrix, which comprises three component parts, namely, a sleeve or bushing 11, a light flexible contoured member 12, termed a cervical form, and a mandrel 13. All three component parts are of non-corrosive metallic material, preferably of stainless steel.

The bushing 11 is tapered, with one end 14 slightly larger in diameter than the other end 16, for a purpose that will appear hereinafter. The contoured cervical form 12, as seen in full lines in FIG. 1, is a flat piece of thin stainless steel material, preferably about 0.002 inch in thickness being tongue shaped as shown in FIG. 1, with a rounded tip portion 17, rectangular rear body portion 18, and an intermediate portion 19 joined to the tip portion 17 by converging arcuate sides. As seen in FIG. 1, the cervical form 12, as a flat sheet, may comprise three different shapes, solid, dotted or dot-dash. In general, the flexible sheet 12 is roughly about 1 inch in length and about ¾ of an inch at the rear body portion. The mandrel 13 is shown with a forward portion 21 and an enlarged rear portion 22.

In assembling the component parts to form the dental instrument 10, rear body portion 18 of the flexible contoured member 12 is squeezed into a roll-like form and the tip portion 17 is inserted into the larger end 14 of the bushing 11 and pushed therethrough to the position shown in FIG. 4, after which the reduced end 21 of the mandrel 13 is forced within the coiled body portion 18 of the member 12 up to the enlarged rear portion 22, to lock the assembly. In some instances, the mandrel 13 may not be required, as the Dentist may prefer using merely the sleeve 11 and flexible member 12.

As to use of the dental instrument 10, the proper size (there will be about three sizes produced) of the flexible contoured member 12 is selected by the Dentist to accurately fit the gingival portion of the cavity. If additional festooning is required, it should be done with a sharp crown and bridge dental shears. The parts are then assembled, as indicated hereinbefore.

The filling material 23 (composite) is now prepared and placed upon the contoured member 12 adjacent the tip portion 17, using a dental tool (not shown) for this purpose. The loaded instrument 10 is then carried to the tooth 24 and, as seen in FIG. 5, the contoured member 12 is placed gingival to the tooth cavity 26, engaging the tooth surface, with the leading edge of the tip portion 17 slightly disposed underneath the gum 27 and engaging the tooth surface. The filling material 23 is then moved down the contoured member 12 by an instrument 28 and compressed to the deepest portion of the cavity 26. Leaving a slight excess of the filling material 23 over the area of the tooth cavity 26, the instrument 10 is placed against the tooth, as seen in FIG. 6, and held in place for the required setting time. Upon removal of the instrument 10 after the complete set (2 to 3 minutes) a glassy, smooth and condensed filling will remain. There will be little or no excess filling material 23 at the gingival margin, thereby facilitating finishing operations.

As seen in the preceding paragraph, the dental instrument 10 is manually held against the tooth 24 for about two to three minutes for the filling material 23 to set. This holding period may prove tedious to the Dentist, especially as the holding pressure should be fairly constant. Accordingly, in the next embodiment of the invention a mechanical holding means is substituted for the manual holding means.

Referring now to FIGS. 7 to 10, there is shown a dental instrument and clamp combination 29, the dental instrument in this embodiment comprising the flexible member 12 of which the lower coiled portion is inserted in the bushing 11, as heretofore. The clamp 31 comprises an off-set bracket having an upstanding web 32 with a lower transverse arm 33 and an upper transverse 34. The upper arm 34 is formed with a pair of spaced, upstanding shoulders 36 between which is pivotally mounted, as by a pin 37 secured in the shoulders, an eccentric member 38. Extending upwardly from the eccentric member 38 is an arcuately shaped spring member 39 with a forked claw 41 at its outward end for engagement against a tooth, as seen in FIG. 7. For actuating the eccentric member 38 and, in turn, the claw 41, a screw with a knurled head 42 is threadedly mounted in the base of the upper arm 34. The lower arm 33 has fixedly mounted upon its upper surface a spring 43 and a solid mandrel 44, as by a rivet 46, as shown, or by any other suitable means including a screw (not shown) threadedly inserted into the mandrel 44. The spring 43, as shown, includes an arcuately shaped upstanding arm 47 with an end portion 48 biased against the spring member 39.

In operation, the flexible member 12 is coiled by the Dentist and inserted into the tapered bushing 11, as described in the prior embodiment, after which this assembly is placed upon the mandrel 44 of the clamp 31. The entire combination 29 is then used by the Dentist in substantially the same heretofore described manner, except that instead of manually holding the instrument 10 against the tooth 24, as shown in FIG. 6, the flexible member 12 is clamped to the tooth in the manner shown in FIG. 7. It is evident that a clockwise rotation of the knurled screw 42 causes both the claw 41 and flexible member 12 to press against the tooth 24 while counterclockwise rotation of the screw 42 causes the claw to retract under pressure of the biasing spring end portion 48, thereby releasing the flexible member 12.

As various changes may be made in the form, construction and arrangement of the parts herein, without departing from the spirit and scope of the invention and without sacrificing any of its advantages, it is to be understood that all matters are to be interpreted as illustrative and not in any limiting sense.

What is claimed is:

1. A dental instrument for carrying and applying a filling material to a cervical cavity of a tooth comprising, in combination, a flexible sheet of non-corrosive metal of arcuate shape in transverse section with an upper concave surface and having a single forward end portion both longitudinally and circumferentially resilient, said flexible sheet being of stainless steel and of a thickness of about 0.002 inch, means for folding said forward end portion of said flexible sheet into a predetermined arcuate form and a rear body portion of said flexible sheet into a coiled form, said forward end portion having a single rounded tip with an arcuate sloping side and an upper concave surface contoured to conform to the surface of a tooth, said folding means being a bushing through which said flexible sheet is inserted and formed thereby into a rounded cervical form at its tip portion and said coiled body portion thereof within said bushing, means for securing said flexible sheet within said bushing, said securing means being a mandrel disposed within said coiled body portion of said flexible sheet for pressing said body portion against an inner wall of said bushing, said forward end portion being adapted to carry and apply said filling material to said tooth cavity and held compressed against said filled tooth a predetermined time interval, and clamping means for holding said flexible sheet against said filled tooth, whereby said filling material upon setting is conformed to the tooth surface by said forward end portion.

2. A dental instrument in accordance with claim 1, wherein said clamping means comprises an off-set bracket with spaced transverse arms, an eccentric member pivotally carried by one of said arms, a resilient element extending from said eccentric member and adapted to press against one side of said tooth, means for removably securing said bushing and flexible sheet onto the other of said arms, said flexible sheet being adapted to press against the other side of said tooth, and screw means threadedly carried by said one of said arms for actuating said resilient element, whereby said flexible sheet is adapted to be drawn against said filled tooth as pressure is applied by said resilient element and held thereagainst a predetermined period of time.

3. A dental instrument in accordance with claim 1, wherein said one of said arms includes a pair of spaced upstanding shoulders, and a pin disposed across said shoulders, and wherein said eccentric member is pivotally carried upon said pin.

4. A dental instrument in accordance with claim 3, wherein said securing means includes a mandrel and means for rigidly fastening said mandrel to said other of said arms.

5. A dental instrument in accordance with claim 4, including a spring element secured at one end to said other of said arms and having its free end biased against said resilient element.

* * * * *